US008462123B1

(12) United States Patent
Sears

(10) Patent No.: US 8,462,123 B1
(45) Date of Patent: Jun. 11, 2013

(54) CONSTRAINED KEYBOARD ORGANIZATION

(75) Inventor: Nickolas Jay Sears, Renton, WA (US)

(73) Assignee: Google Inc., Mountain View, CA (US)

( * ) Notice: Subject to any disclaimer, the term of this patent is extended or adjusted under 35 U.S.C. 154(b) by 933 days.

(21) Appl. No.: 12/255,493

(22) Filed: Oct. 21, 2008

(51) Int. Cl.
 *G09G 5/00* (2006.01)

(52) U.S. Cl.
 USPC .......................................... 345/173; 345/168

(58) Field of Classification Search
 USPC .............. 379/433; 400/486; 341/22; 345/173
 See application file for complete search history.

(56) References Cited

U.S. PATENT DOCUMENTS

| | | | |
|---|---|---|---|
| 6,671,683 B2 | 12/2003 | Kanno | |
| 7,008,127 B1 | 3/2006 | Kurriss | |
| 7,030,863 B2 | 4/2006 | Longe et al. | |
| 7,456,759 B2 * | 11/2008 | Griffin et al. | 341/22 |
| 7,576,662 B2 | 8/2009 | Jung et al. | |
| 7,650,348 B2 * | 1/2010 | Lowles et al. | 707/999.101 |
| 7,658,561 B2 * | 2/2010 | Vuong | 400/486 |
| 2002/0019731 A1 | 2/2002 | Masui et al. | |
| 2004/0210434 A1 | 10/2004 | Wang et al. | |
| 2006/0193468 A1* | 8/2006 | Ahn | 379/433.07 |
| 2007/0147933 A1 | 6/2007 | Zhang | |
| 2008/0304892 A1 | 12/2008 | Baker | |
| 2009/0027345 A1 | 1/2009 | Fux et al. | |
| 2009/0083028 A1 | 3/2009 | Davtchev et al. | |
| 2009/0222445 A1 | 9/2009 | Tavor | |

OTHER PUBLICATIONS

Azad, Md. Abul Kalam, Rezwana Sharmeen, Shabbir Ahmad, and S.M. Kamruzzaman. "Completely Enhanced Cell Phone Keypad." The 1st International Conference on Information Management and Business, IBM, 2005. (5 pages).
Georgia State University. "High Frequency Alphabet Layout for On-Screen Scanning." [Retrieved on Jun. 20, 2011]. Retrieved from the Internet <URL: http://education.gsu.edu/PhysicalDis/high_frequency_alphabet_layout_f.htm> (2 pages).
Wikipedia. "Dvorak Simplified Keyboard." [Retrieved on Jun. 20, 2011]. Retrieved from the Internet <URL: http://en.wikipedia.org/wiki/Dvorak_Simplified_Keyboard> (19 pages).
Office Action issued in U.S. Appl. No. 13/245,346 on Dec. 29, 2011, 16 pages.

* cited by examiner

*Primary Examiner* — Amare Mengistu
*Assistant Examiner* — Joseph G Rodriguez
(74) *Attorney, Agent, or Firm* — Fish & Richardson P.C.

(57) ABSTRACT

The subject matter of this specification can be embodied in, among other things, a method for generating a keypad layout. The method may include determining a frequency distribution of characters for a text sample and generating character groupings using the frequency distribution. The method may further comprise assigning the character groupings to keys on the keypad so that characters that appear most frequently in the text sample can be selected with a single keystroke.

28 Claims, 15 Drawing Sheets

200

| | Frequency Distribution | | | | |
|---|---|---|---|---|---|
| LTR | English | French | German | Spanish | Italian |
| A | 8.2% | 8.1% | 6.5% | 12.5% | 11.7% |
| B | 1.5% | 0.9% | 1.9% | 1.4% | 0.9% |
| C | 2.8% | 3.3% | 3.1% | 4.7% | 4.5% |
| D | 4.3% | 3.7% | 5.1% | 5.8% | 3.7% |
| E | 12.7% | 17.1% | 17.4% | 13.7% | 11.8% |
| F | 2.2% | 1.1% | 1.7% | 0.7% | 1.0% |
| G | 2.0% | 0.9% | 3.0% | 1.0% | 1.6% |
| H | 6.1% | 0.7% | 4.8% | 0.7% | 1.5% |
| I | 7.0% | 7.6% | 7.6% | 6.3% | 11.3% |
| J | 0.2% | 0.5% | 0.3% | 0.4% | 0.0% |
| K | 0.8% | 0.0% | 1.2% | 0.0% | 0.0% |
| L | 4.0% | 5.5% | 3.4% | 5.0% | 6.5% |
| M | 2.4% | 3.0% | 2.5% | 3.1% | 2.5% |
| N | 6.8% | 7.1% | 9.8% | 6.7% | 6.9% |
| O | 7.5% | 5.4% | 2.5% | 8.7% | 9.8% |
| P | 1.9% | 3.0% | 0.8% | 2.5% | 3.1% |
| Q | 0.1% | 1.4% | 0.0% | 0.9% | 0.5% |
| R | 6.0% | 6.6% | 7.0% | 6.9% | 6.4% |
| S | 6.3% | 7.9% | 7.3% | 8.0% | 5.0% |
| T | 9.1% | 7.2% | 6.2% | 4.6% | 5.6% |
| U | 2.8% | 6.4% | 4.4% | 3.9% | 3.0% |
| V | 1.0% | 1.6% | 0.7% | 0.9% | 2.1% |
| W | 2.4% | 0.1% | 1.9% | 0.0% | 0.0% |
| X | 0.2% | 0.4% | 0.0% | 0.2% | 0.0% |
| Y | 2.0% | 0.3% | 0.0% | 0.9% | 0.0% |
| Z | 0.1% | 0.1% | 1.1% | 0.5% | 0.5% |
| | 100% | 100% | 100% | 100% | 100% |

| | Frequency Distribution | | | | | |
|---|---|---|---|---|---|---|
| Count | Letter | English | French | German | Spanish | Italian |
| 1 | E | 12.7% | 17.1% | 17.4% | 13.7% | 11.8% |
| 2 | T | 9.1% | 7.2% | 6.2% | 4.6% | 5.6% |
| 3 | A | 8.2% | 8.1% | 6.5% | 12.5% | 11.7% |
| 4 | O | 7.5% | 5.4% | 2.5% | 8.7% | 9.8% |
| 5 | I | 7.0% | 7.6% | 7.6% | 6.3% | 11.3% |
| 6 | N | 6.8% | 7.1% | 9.8% | 6.7% | 6.9% |
| 7 | S | 6.3% | 7.9% | 7.3% | 8.0% | 5.0% |
| 8 | H | 6.1% | 0.7% | 4.8% | 0.7% | 1.5% |
| 9 | R | 6.0% | 6.6% | 7.0% | 6.9% | 6.4% |
| 10 | D | 4.3% | 3.7% | 5.1% | 5.8% | 3.7% |
| 11 | L | 4.0% | 5.5% | 3.4% | 5.0% | 6.5% |
| 12 | C | 2.8% | 3.3% | 3.1% | 4.7% | 4.5% |
| 13 | U | 2.8% | 6.4% | 4.4% | 3.9% | 3.0% |
| Sub Total | | 83% | 87% | 85% | 87% | 88% |
| 14 | M | 2.4% | 3.0% | 2.5% | 3.1% | 2.5% |
| 15 | W | 2.4% | 0.1% | 1.9% | 0.0% | 0.0% |
| 16 | F | 2.2% | 1.1% | 1.7% | 0.7% | 1.0% |
| 17 | G | 2.0% | 0.9% | 3.0% | 1.0% | 1.6% |
| 18 | Y | 2.0% | 0.3% | 0.0% | 0.9% | 0.0% |
| 19 | P | 1.9% | 3.0% | 0.8% | 2.5% | 3.1% |
| 20 | B | 1.5% | 0.9% | 1.9% | 1.4% | 0.9% |
| 21 | V | 1.0% | 1.6% | 0.7% | 0.9% | 2.1% |
| 22 | K | 0.8% | 0.0% | 1.2% | 0.0% | 0.0% |
| 23 | J | 0.2% | 0.5% | 0.3% | 0.4% | 0.0% |
| 24 | X | 0.2% | 0.4% | 0.0% | 0.2% | 0.0% |
| 25 | Q | 0.1% | 1.4% | 0.0% | 0.9% | 0.5% |
| 26 | Z | 0.1% | 0.1% | 1.1% | 0.5% | 0.5% |
| | Total | 100% | 100% | 100% | 100% | 100% |

| | | Alpha | | | QWERTY | | | Frequency Distribution | | | | |
|---|---|---|---|---|---|---|---|---|---|---|---|---|
| | Letter | 8 | 15 | 21 | 15 | 21 | 24 | English | French | German | Spanish | Italian |
| 1 | E | 2 | 1 | 1 | 1 | 1 | 1 | 12.7% | 17.1% | 17.4% | 13.7% | 11.8% |
| 2 | T | 1 | 1 | 1 | 1 | 1 | 1 | 9.1% | 7.2% | 6.2% | 4.6% | 5.6% |
| 3 | A | 1 | 1 | 1 | 1 | 1 | 1 | 8.2% | 8.1% | 6.5% | 12.5% | 11.7% |
| 4 | O | 3 | 1 | 1 | 1 | 1 | 1 | 7.5% | 5.4% | 2.5% | 8.7% | 9.8% |
| 5 | I | 3 | 1 | 1 | 1 | 1 | 1 | 7.0% | 7.6% | 7.6% | 6.3% | 11.3% |
| 6 | N | 2 | 1 | 1 | 1 | 1 | 1 | 6.8% | 7.1% | 9.8% | 6.7% | 6.9% |
| 7 | S | 4 | 1 | 1 | 1 | 1 | 1 | 6.3% | 7.9% | 7.3% | 8.0% | 5.0% |
| 8 | H | 2 | 1 | 1 | 1 | 1 | 1 | 6.1% | 0.7% | 4.8% | 0.7% | 1.5% |
| 9 | R | 3 | 1 | 1 | 2 | 1 | 1 | 6.0% | 6.6% | 7.0% | 6.9% | 6.4% |
| 10 | D | 1 | 2 | 1 | 2 | 1 | 1 | 4.3% | 3.7% | 5.1% | 5.8% | 3.7% |
| 11 | L | 3 | 1 | 1 | 1 | 1 | 1 | 4.0% | 5.5% | 3.4% | 5.0% | 6.5% |
| 12 | C | 3 | 1 | 1 | 1 | 1 | 1 | 2.8% | 3.3% | 3.1% | 4.7% | 4.5% |
| 13 | U | 2 | 1 | 1 | 2 | 1 | 1 | 2.8% | 6.4% | 4.4% | 3.9% | 3.0% |
| Sub Total | | 30 | 14 | 13 | 16 | 13 | 13 | 83.0% | 87.0% | 85.0% | 87.0% | 88.0% |
| 14 | M | 1 | 2 | 1 | 1 | 1 | 1 | 2.4% | 3.0% | 2.5% | 3.1% | 2.5% |
| 15 | W | 1 | 1 | 1 | 1 | 1 | 1 | 2.4% | 0.1% | 1.9% | 0.0% | 0.0% |
| 16 | F | 3 | 1 | 1 | 1 | 1 | 1 | 2.2% | 1.1% | 1.7% | 0.7% | 1.0% |
| 17 | G | 1 | 2 | 1 | 2 | 1 | 1 | 2.0% | 0.9% | 3.0% | 1.0% | 1.6% |
| 18 | Y | 3 | 1 | 1 | 2 | 2 | 1 | 2.0% | 0.3% | 0.0% | 0.9% | 0.0% |
| 19 | P | 1 | 2 | 1 | 2 | 2 | 1 | 1.9% | 3.0% | 0.8% | 2.5% | 3.1% |
| 20 | B | 2 | 2 | 1 | 1 | 1 | 1 | 1.5% | 0.9% | 1.9% | 1.4% | 0.9% |
| 21 | V | 3 | 2 | 2 | 2 | 1 | 1 | 1.0% | 1.6% | 0.7% | 0.9% | 2.1% |
| 22 | K | 2 | 3 | 1 | 2 | 2 | 1 | 0.8% | 0.0% | 1.2% | 0.0% | 0.0% |
| 23 | J | 1 | 2 | 2 | 2 | 2 | 1 | 0.2% | 0.5% | 0.3% | 0.4% | 0.0% |
| 24 | X | 2 | 2 | 2 | 2 | 1 | 2 | 0.2% | 0.4% | 0.0% | 0.2% | 0.0% |
| 25 | Q | 2 | 3 | 2 | 2 | 2 | 2 | 0.1% | 1.4% | 0.0% | 0.9% | 0.5% |
| 26 | Z | 4 | 2 | 2 | 1 | 1 | 1 | 0.1% | 0.1% | 1.1% | 0.5% | 0.5% |
| Keystroke Count | | 56 | 39 | 31 | 37 | 31 | 28 | 100% | 100% | 100% | 100% | 100% |

FIG. 2C

| | Letter | Alpha 8 Key EKI | | | | Alpha 15 Key EKI | | | | Alpha 21 Key EKI | | | |
|---|---|---|---|---|---|---|---|---|---|---|---|---|---|
| | | En | Fr | Ge | Sp | It | En | Fr | Ge | Sp | It | En | Fr | Ge | Sp | It |
| 1 | E | 0.25 | 0.34 | 0.35 | 0.27 | 0.24 | 0.13 | 0.17 | 0.17 | 0.14 | 0.12 | 0.13 | 0.17 | 0.17 | 0.14 | 0.12 |
| 2 | T | 0.09 | 0.07 | 0.06 | 0.05 | 0.06 | 0.09 | 0.07 | 0.06 | 0.05 | 0.06 | 0.09 | 0.07 | 0.06 | 0.05 | 0.06 |
| 3 | A | 0.08 | 0.08 | 0.07 | 0.13 | 0.12 | 0.08 | 0.08 | 0.07 | 0.13 | 0.12 | 0.08 | 0.08 | 0.07 | 0.13 | 0.12 |
| 4 | O | 0.23 | 0.16 | 0.08 | 0.26 | 0.29 | 0.08 | 0.05 | 0.03 | 0.09 | 0.10 | 0.08 | 0.05 | 0.03 | 0.09 | 0.10 |
| 5 | I | 0.21 | 0.23 | 0.23 | 0.19 | 0.34 | 0.07 | 0.08 | 0.08 | 0.06 | 0.11 | 0.07 | 0.08 | 0.08 | 0.06 | 0.11 |
| 6 | N | 0.14 | 0.14 | 0.20 | 0.13 | 0.14 | 0.07 | 0.07 | 0.10 | 0.07 | 0.07 | 0.07 | 0.07 | 0.10 | 0.07 | 0.07 |
| 7 | S | 0.25 | 0.32 | 0.29 | 0.32 | 0.20 | 0.06 | 0.08 | 0.07 | 0.08 | 0.05 | 0.06 | 0.08 | 0.05 | 0.08 | 0.05 |
| 8 | H | 0.12 | 0.01 | 0.10 | 0.01 | 0.03 | 0.06 | 0.01 | 0.05 | 0.01 | 0.02 | 0.06 | 0.01 | 0.07 | 0.01 | 0.02 |
| 9 | R | 0.18 | 0.20 | 0.21 | 0.21 | 0.19 | 0.06 | 0.07 | 0.07 | 0.07 | 0.06 | 0.06 | 0.07 | 0.05 | 0.07 | 0.06 |
| 10 | D | 0.04 | 0.04 | 0.05 | 0.06 | 0.04 | 0.09 | 0.07 | 0.10 | 0.12 | 0.07 | 0.04 | 0.04 | 0.05 | 0.06 | 0.04 |
| 11 | L | 0.12 | 0.16 | 0.10 | 0.15 | 0.20 | 0.04 | 0.05 | 0.03 | 0.05 | 0.07 | 0.04 | 0.05 | 0.03 | 0.05 | 0.07 |
| 12 | C | 0.08 | 0.10 | 0.09 | 0.14 | 0.14 | 0.03 | 0.03 | 0.03 | 0.04 | 0.05 | 0.03 | 0.03 | 0.03 | 0.04 | 0.05 |
| 13 | U | 0.06 | 0.13 | 0.09 | 0.08 | 0.06 | 0.03 | 0.06 | 0.04 | 0.06 | 0.03 | 0.03 | 0.06 | 0.04 | 0.04 | 0.03 |
| 14 | M | 0.02 | 0.03 | 0.03 | 0.03 | 0.03 | 0.05 | 0.06 | 0.05 | 0.06 | 0.05 | 0.02 | 0.03 | 0.03 | 0.03 | 0.03 |
| 15 | W | 0.02 | 0.00 | 0.02 | 0.00 | 0.00 | 0.02 | 0.00 | 0.02 | 0.00 | 0.00 | 0.02 | 0.00 | 0.02 | 0.00 | 0.00 |
| 16 | F | 0.07 | 0.03 | 0.05 | 0.02 | 0.03 | 0.04 | 0.01 | 0.04 | 0.01 | 0.03 | 0.02 | 0.01 | 0.02 | 0.01 | 0.02 |
| 17 | G | 0.02 | 0.01 | 0.03 | 0.01 | 0.02 | 0.02 | 0.02 | 0.01 | 0.02 | 0.00 | 0.02 | 0.01 | 0.03 | 0.01 | 0.00 |
| 18 | Y | 0.06 | 0.01 | 0.00 | 0.03 | 0.00 | 0.04 | 0.03 | 0.04 | 0.05 | 0.00 | 0.02 | 0.01 | 0.00 | 0.03 | 0.00 |
| 19 | P | 0.02 | 0.03 | 0.04 | 0.03 | 0.03 | 0.03 | 0.02 | 0.01 | 0.03 | 0.06 | 0.02 | 0.03 | 0.02 | 0.03 | 0.03 |
| 20 | B | 0.03 | 0.02 | 0.02 | 0.03 | 0.02 | 0.02 | 0.03 | 0.04 | 0.02 | 0.02 | 0.02 | 0.02 | 0.02 | 0.02 | 0.01 |
| 21 | V | 0.03 | 0.05 | 0.02 | 0.03 | 0.06 | 0.02 | 0.00 | 0.01 | 0.00 | 0.04 | 0.01 | 0.01 | 0.01 | 0.01 | 0.04 |
| 22 | K | 0.02 | 0.00 | 0.02 | 0.00 | 0.00 | 0.00 | 0.01 | 0.04 | 0.00 | 0.00 | 0.01 | 0.00 | 0.02 | 0.00 | 0.00 |
| 23 | J | 0.00 | 0.01 | 0.00 | 0.00 | 0.00 | 0.00 | 0.00 | 0.00 | 0.00 | 0.00 | 0.00 | 0.00 | 0.00 | 0.01 | 0.00 |
| 24 | X | 0.00 | 0.01 | 0.00 | 0.02 | 0.01 | 0.00 | 0.01 | 0.00 | 0.00 | 0.00 | 0.00 | 0.01 | 0.00 | 0.01 | 0.00 |
| 25 | Q | 0.00 | 0.03 | 0.00 | 0.02 | 0.01 | 0.00 | 0.04 | 0.00 | 0.03 | 0.02 | 0.00 | 0.03 | 0.00 | 0.02 | 0.01 |
| 26 | Z | 0.00 | 0.01 | 0.05 | 0.02 | 0.02 | 0.00 | 0.00 | 0.02 | 0.01 | 0.01 | 0.00 | 0.00 | 0.02 | 0.01 | 0.01 |
| | EKI | 2.15 | 2.21 | 2.17 | 2.21 | 2.24 | 1.15 | 1.17 | 1.18 | 1.18 | 1.15 | 1.01 | 1.04 | 1.02 | 1.03 | 1.03 |

FIG. 2D

| Letter | QWERTY 15 Key EKI | | | | QWERTY 21 Key EKI | | | | QWERTY 24 Key EKI | | | |
|---|---|---|---|---|---|---|---|---|---|---|---|---|
| | En | Fr | Ge | Sp | It | En | Fr | Ge | Sp | It | En | Fr | Ge | Sp | It |
| E | 0.13 | 0.17 | 0.17 | 0.14 | 0.12 | 0.13 | 0.17 | 0.17 | 0.14 | 0.12 | 0.13 | 0.17 | 0.17 | 0.14 | 0.12 |
| T | 0.09 | 0.07 | 0.06 | 0.05 | 0.06 | 0.09 | 0.07 | 0.06 | 0.05 | 0.06 | 0.09 | 0.07 | 0.06 | 0.05 | 0.06 |
| A | 0.08 | 0.08 | 0.07 | 0.13 | 0.12 | 0.08 | 0.08 | 0.07 | 0.13 | 0.12 | 0.08 | 0.08 | 0.07 | 0.13 | 0.12 |
| O | 0.08 | 0.05 | 0.03 | 0.09 | 0.10 | 0.08 | 0.05 | 0.03 | 0.09 | 0.10 | 0.08 | 0.05 | 0.03 | 0.09 | 0.10 |
| I | 0.07 | 0.08 | 0.08 | 0.06 | 0.11 | 0.07 | 0.08 | 0.08 | 0.06 | 0.11 | 0.07 | 0.08 | 0.08 | 0.06 | 0.11 |
| N | 0.07 | 0.07 | 0.10 | 0.07 | 0.07 | 0.07 | 0.07 | 0.10 | 0.07 | 0.07 | 0.07 | 0.07 | 0.10 | 0.07 | 0.07 |
| S | 0.06 | 0.08 | 0.07 | 0.08 | 0.05 | 0.06 | 0.08 | 0.07 | 0.08 | 0.05 | 0.06 | 0.08 | 0.07 | 0.08 | 0.05 |
| H | 0.06 | 0.01 | 0.05 | 0.01 | 0.02 | 0.06 | 0.01 | 0.05 | 0.01 | 0.02 | 0.06 | 0.01 | 0.05 | 0.01 | 0.02 |
| R | 0.06 | 0.07 | 0.07 | 0.07 | 0.06 | 0.06 | 0.07 | 0.07 | 0.07 | 0.06 | 0.06 | 0.07 | 0.07 | 0.07 | 0.06 |
| D | 0.04 | 0.04 | 0.05 | 0.05 | 0.04 | 0.04 | 0.04 | 0.05 | 0.06 | 0.04 | 0.04 | 0.04 | 0.05 | 0.06 | 0.04 |
| L | 0.04 | 0.05 | 0.03 | 0.05 | 0.07 | 0.04 | 0.05 | 0.03 | 0.05 | 0.07 | 0.04 | 0.05 | 0.03 | 0.05 | 0.07 |
| C | 0.03 | 0.03 | 0.03 | 0.05 | 0.05 | 0.03 | 0.03 | 0.03 | 0.05 | 0.05 | 0.03 | 0.03 | 0.03 | 0.05 | 0.05 |
| U | 0.03 | 0.06 | 0.04 | 0.04 | 0.03 | 0.03 | 0.06 | 0.04 | 0.04 | 0.03 | 0.03 | 0.06 | 0.04 | 0.04 | 0.03 |
| M | 0.02 | 0.03 | 0.03 | 0.03 | 0.03 | 0.02 | 0.03 | 0.03 | 0.03 | 0.03 | 0.02 | 0.03 | 0.03 | 0.03 | 0.03 |
| W | 0.02 | 0.00 | 0.02 | 0.00 | 0.00 | 0.02 | 0.00 | 0.02 | 0.00 | 0.00 | 0.02 | 0.00 | 0.02 | 0.00 | 0.00 |
| F | 0.02 | 0.01 | 0.02 | 0.01 | 0.01 | 0.02 | 0.01 | 0.02 | 0.01 | 0.01 | 0.02 | 0.01 | 0.02 | 0.01 | 0.01 |
| G | 0.02 | 0.01 | 0.03 | 0.01 | 0.02 | 0.02 | 0.01 | 0.03 | 0.01 | 0.02 | 0.02 | 0.01 | 0.03 | 0.01 | 0.02 |
| Y | 0.02 | 0.00 | 0.00 | 0.01 | 0.00 | 0.02 | 0.00 | 0.00 | 0.01 | 0.00 | 0.02 | 0.00 | 0.00 | 0.01 | 0.00 |
| P | 0.02 | 0.03 | 0.01 | 0.03 | 0.03 | 0.02 | 0.03 | 0.01 | 0.03 | 0.03 | 0.02 | 0.03 | 0.01 | 0.03 | 0.03 |
| B | 0.01 | 0.01 | 0.02 | 0.01 | 0.01 | 0.01 | 0.01 | 0.02 | 0.01 | 0.01 | 0.01 | 0.01 | 0.02 | 0.01 | 0.01 |
| V | 0.01 | 0.02 | 0.01 | 0.01 | 0.02 | 0.01 | 0.02 | 0.01 | 0.01 | 0.02 | 0.01 | 0.02 | 0.01 | 0.01 | 0.02 |
| K | 0.00 | 0.00 | 0.01 | 0.00 | 0.00 | 0.00 | 0.00 | 0.01 | 0.00 | 0.00 | 0.00 | 0.00 | 0.01 | 0.00 | 0.00 |
| J | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| X | 0.00 | 0.03 | 0.00 | 0.02 | 0.00 | 0.00 | 0.03 | 0.00 | 0.02 | 0.00 | 0.00 | 0.03 | 0.00 | 0.02 | 0.00 |
| Q | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Z | 0.00 | 0.00 | 0.01 | 0.01 | 0.00 | 0.00 | 0.00 | 0.01 | 0.01 | 0.00 | 0.00 | 0.00 | 0.01 | 0.01 | 0.00 |
| EKI | 1.21 | 1.25 | 1.22 | 1.23 | 1.20 | 1.05 | 1.05 | 1.02 | 1.05 | 1.04 | 1.00 | 1.02 | 1.00 | 1.01 | 1.01 |

FIG. 2E

CONSTRAINED KEYBOARD ORGANIZATION

TECHNICAL FIELD

This instant specification relates to keypad layout.

BACKGROUND

As computer processors have decreased in size and expense, mobile computing devices such as cellular telephones and personal digital assistants (PDAs) have become increasingly widespread. Designed to be portable, mobile computing devices are lightweight and generally small enough to fit comfortably in a pocket or handbag. However, the portability of mobile computing devices comes at a price: mobile devices often have small keypads that have several characters mapped to each key. These compact keypads can require entry techniques such as "multi-tap" data entry whereby a user presses a key a number of times that relates to the position of a character on a key. For example, if a key lists the letters "A," "B," and "C," the user will tap the key twice to enter a "B" and three times to enter a "C."

SUMMARY

In general, this document describes techniques for generating keypad layouts, and layouts resulting from such techniques. In general, the techniques described here seek to group letters of keypad keys—whatever the number of keys on the keypad—so as to provide simplified data entry on the keypad. For example, letters may be arranged or grouped so that frequently used letters appear first on a key or alone on a key. In this manner, a user will not have to press such keys very many times to enter letters in a multi-tap or similar implementation and their data entry can be sped up as a result. Also, in situations that involve disambiguation of input that is ambiguous because some keys can have more than one value, appropriate assignment of characters to keys using the techniques described here can reduce the level of ambiguity for a group of strokes (e.g., by placing commonly-used characters alone on a key or in smaller groups) and thereby improve the accuracy of a disambiguation scheme.

In one implementation, a method for generating a keypad layout is disclosed. The method may include determining a frequency distribution of characters for a text sample and generating character groupings using the frequency distribution. The method may further comprise assigning the character groupings to keys on the keypad so that characters that appear most frequently in the text sample can be selected with a single keystroke.

In certain aspects, the method may further comprise selecting the text sample from samples that are representative of text produced by members of a target group. The method may also further comprise generating character groupings by arranging the characters according to a predetermined sequence and grouping adjacent characters in the sequence such that each character grouping contains at least one character that frequently appears in the text sample. In addition, generating character groupings may further comprise selecting a keypad layout that determines the predetermined sequence of the characters.

In an alternative implementation, a keypad can be organized to reduce the effective keypad index (EKI) of the keypad. The keypad may comprise a plurality of keys in the keypad, each key having one or more characters visually mapped onto it. The keypad may have fewer keys than characters mapped onto the keys and be arranged such that characters having highest frequencies within a representative sample of text can be selected with one keystroke. The keypad may include a Space-Return key. Characters may be mapped onto keypad keys so that more than 83% of the characters across a text sample appear as a first character on a key.

The systems and techniques described here may provide one or more of the following advantages. First, a system can permit a user to enter character information more quickly and more accurately using a constrained keypad. Such data entry may also be provided on a relatively small device. In addition, the techniques may, in certain circumstances, be implemented in software so as to permit different keypad arrangements depending on a user's or designer's preferences. For example, keypads having different numbers of keys may be employed, and the order of characters may change from keypad to keypad (e.g., using QWERTY or alphabetical arrangements). Such techniques may thus improve the user experience for a device such as a smart phone, and may cause a user to access services that require character-based data entry more often.

The details of one or more embodiments are set forth in the accompanying drawings and the description below. Other features and advantages will be apparent from the description and drawings, and from the claims.

DESCRIPTION OF DRAWINGS

FIGS. 2A-2E illustrate example tables that can be used to organize a keypad according to a frequency distribution.

Like reference symbols in the various drawings indicate like elements.

DETAILED DESCRIPTION

This document describes systems and techniques for designing keypads and keypad layouts. In general, a sample text representative of a target population is selected. For example, if the target population is English-speaking, 20-35 year old cellular telephone users, the representative text may consist of text messages sent by adults within that demographic group. Broader demographic groups may also be used, such as all users of certain computing applications. Next, a frequency distribution of the letters in the sample text is created. In an illustrative example, text messages can be analyzed to determine how often each letter occurs in a group of text messages that may represent the target population. Subsequently, the letters can be arranged in alphabetical or other order and grouped using the frequency distribution to minimize an Effective Keystroke Index (EKI) of the keypad. The EKI represents the average number of keystrokes used to enter in letters from a sample of text. Finally, each character group can be associated with a key on the keypad.

Figure 1:
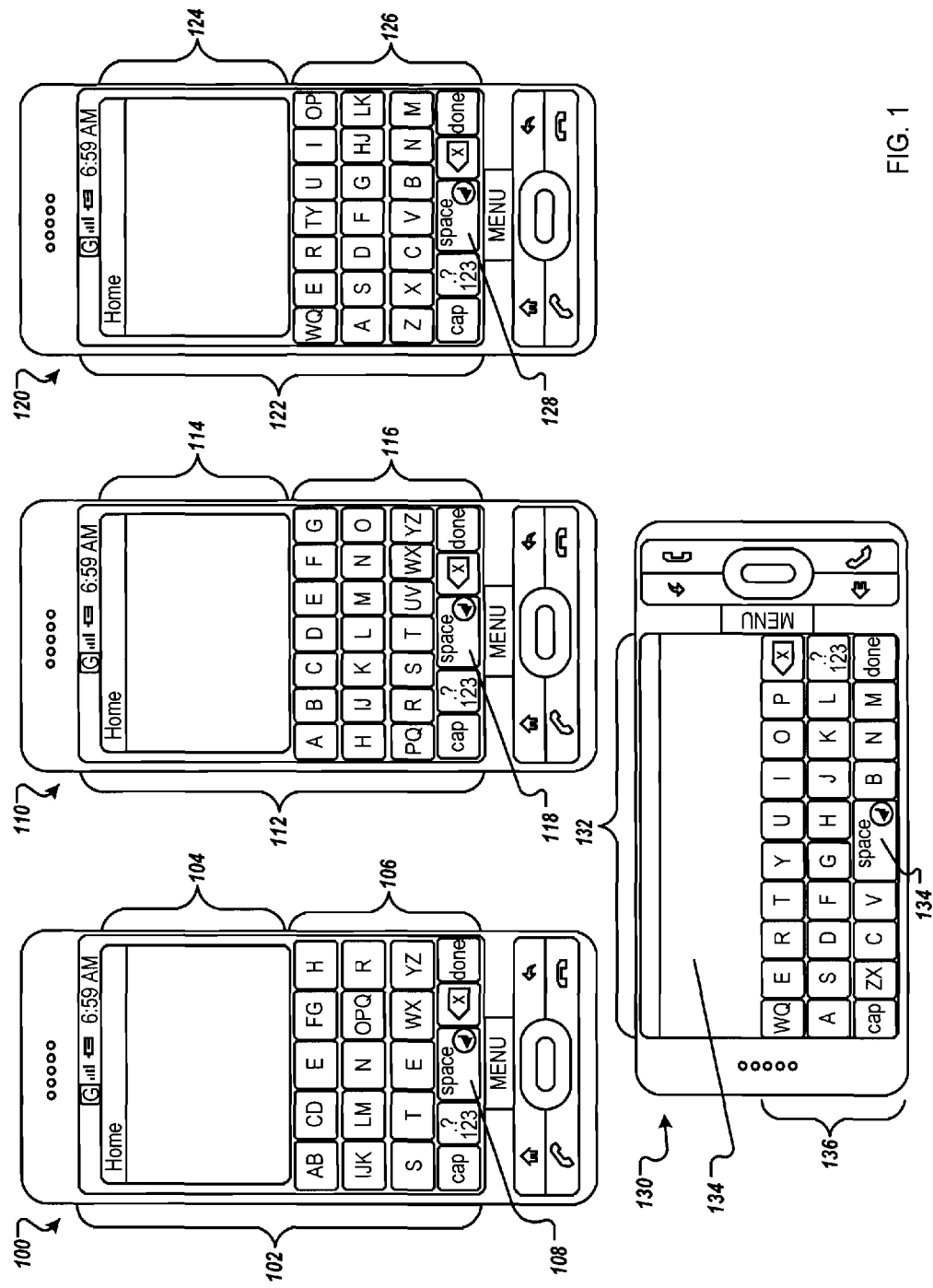
FIG. 1 shows example keypads organized using frequency distribution techniques.

FIG. 1 shows example keypads organized using frequency distribution. For example, FIG. 1 depicts a cellular telephone 100 that includes a touch screen 102, a portion of which displays an input keypad 106. The illustrative keypad 106 is an alphanumeric keypad that has 20 keys arranged in a 4×5 grid. Of the 20 keys shown, 15 have been reserved for letter input, while the remaining 5 keys have been assigned various functions. By tapping areas of the touch screen 102 that correspond to a letter-input key on the keypad 106, an alphanumeric character mapped to the selected key can appear in a display area 104 of the touch screen. For example, by pressing the area of the touch screen 102 containing the "AB" key once, the letter "A" may appear in the display area 104.

The keypad 106 displayed on the touch screen 102 of the exemplary cellular telephone 100 does not have enough letter-input keys to map each of the 26 letters of the English alphabet to a single key. In the illustrative example, multiple characters are mapped to the individual keys so that more than one key stroke may be needed to select certain characters. For instance, as discussed above, the letter "A" is the first letter mapped to the "AB" key and, as such, a single key press inputs the letter "A." That is, the letter "A" is in the primary position associated with that key. To input a secondary character such as the letter "B," a user may need to tap the "AB" key twice within a specified interval (e.g., one or two seconds) or, in some cases, concurrently press another key while pressing the "AB" key. Tertiary characters and beyond may require similar, but in some circumstances more complex, keypad manipulations.

To reduce the number of keystrokes used to input the most commonly used letters (and thereby increase the efficiency of the keypad 106), the illustrative keypad 106 has been organized according to a frequency distribution of the characters. For example, certain letters of the English alphabet are used more often than others. The exemplary techniques described here exploit this imbalance by mapping letters to a keypad 106 in a manner that allows some of the most frequently used letters to be selected with a single touch of the keypad 106. In this example, a representative text corpus such as a series of books, magazines, e-mails, etc. can be selected, so as serve as a basis for determining a representative character distribution. Subsequently, a frequency distribution of the characters in the text corpus can be created. Using the frequency distribution, the characters can be grouped to allow some of the more frequently used characters to be entered with a single keystroke.

Consider the exemplary keypad 106. As discussed in more detail below, by some measures the first letter mapped to each key will constitute, on average, over 80 percent of the letters used in a representative English-language text sample. Because some of the most frequently used letters (in the illustrative example, "A," "C," "E," "F," "H," "I," "L," "N," "O," "R," "S," "T," "U," "W," and "Y") can be input with a single key stroke because they have been placed first on their respective keys, the number of key strokes necessary, on average, to create a English-language message can be reduced.

Closer inspection of keypad 106 shows that certain very common letters—"E," "H," "N," "R," " "S," and "T"—occupy their own keys. Less common letters such as "J," "K," "P," and "Q" may share a key. Also, certain keys may be function keys, such as a caps lock key, or keys for entering non-alphanumeric characters. For example, the illustrative telephone 100 includes a Space-Return key 108. The Space-Return key 108, in some implementations, can combine the functions of the Space and Return keys. For instance, pressing the Space-Return key 108 once may result in a single space appearing in the display area 104. Two presses of the Space-Return key within a specified interval (e.g., one or two seconds) can result in a carriage return in the display area 104. Pressing and holding the Space-Return key may result in repeated spaces appearing the display area 104 until the key is released. The illustrative Space-Return key may save space in the keypad design, which can free up space for other keys. For example, combining the Return and Space keys may allow a keypad to designer to create bigger keys or add more keys to a keypad than might otherwise be possible.

FIG. 1 also shows other keypad layouts. For example, FIG. 1 depicts a cellular telephone 110 with an alphanumeric keypad 116 that includes 26 keys, 21 of which are used to input letters. Like the cellular telephone 100 described above, the keypad 116 includes a Space-Return key 118, and pressing a letter-input key in the keypad 116 can cause a character to be displayed in the display area 114 of the device's 110 touch screen 112. Similarly, the keypad 126 of a third cellular telephone 120 includes 21 letter-input keys arranged in a QWERTY layout. The QWERTY keypad 126 also includes five function keys, one of which is a Space-Return key 128 that can used to enter spaces or carriage returns. As with the previously mentioned cellular telephones, pressing a key in the keypad 126 can cause a character to be displayed in the display area 124 of the device's 120 touch screen 122. Because these illustrative keypads 110, 120 include more keys that the previously described keypad 106, in certain cases, fewer letters may be mapped to some of the keys. For example, unlike the keypad 106 described above, the "AB" key for the cellular telephone 110 in this example has been divided into separate "A" and "B" keys. While this layout may require fewer keystrokes to input certain letters, the reduced key size may make it more difficult to accurately input some letters.

FIG. 1 also shows a fourth cellular telephone 130. This phone 130, like the others described above, includes a touch screen 132, which contains a display area 134 and a QWERTY keypad 136 that includes a Space-Return key 138. However, unlike the previously discussed phones, the display area 134 and keypad 136 are arranged in a horizontal configuration, and the keypad includes three rows. This configuration may create additional room for the display area. For example, the vertical QWERTY keypad 126 described above includes four rows. By reducing the number of rows, the illustrative keypad 136 may leave room for a larger display area.

Although specific alphanumeric and QWERTY keyboard layouts are shown in FIG. 1, other layouts may be used. For example, the cellular phone 100 could include a QWERTY keypad with 20 keys, 15 of which can be used to input letters and the remaining 5 serving various functions such as deleting input characters. It should be noted that other keypad layouts (e.g., QWERTZ, AZERTY, Dvorak, Colemak, user-defined, etc.) may be used and that the number (and size) of the keys on the keypads may differ from those shown. Also, it should be appreciated that, where the keypad is generated on a screen, the layout for the keypad can be readily changed. Thus, for example, the keypad may be customized for particular needs of a user or group of users. As one example, employees within a single organization may have a particular manner of writing (e.g., the use of certain acronyms in the military), and a more particular manner when they are using a particular computing application such as e-mail. As a result, the e-mails of a single user or of a group of users may be analyzed so as to determine a frequency distribution of letter usage in the particular context. Other corpuses of documents may also be selected as a training group for determining an exact or approximate character distribution so as to determine how to assign letters to keys. A device may then be readily programmed to display the characters in the appropriate manner. Also, a particular user may be given the opportunity to select whether they would like an alphabetic, QWERTY, or other layout, and may also be permitted to adjust the grouping of letters where the provided grouping is confusing to them. For example, a user may be permitted to pan through images of a variety of keypad layouts, and the user may select a particular one for their layout. The user may also be shown the efficiency of each keypad for a particular training set of documents as they pan.

Figure 5:
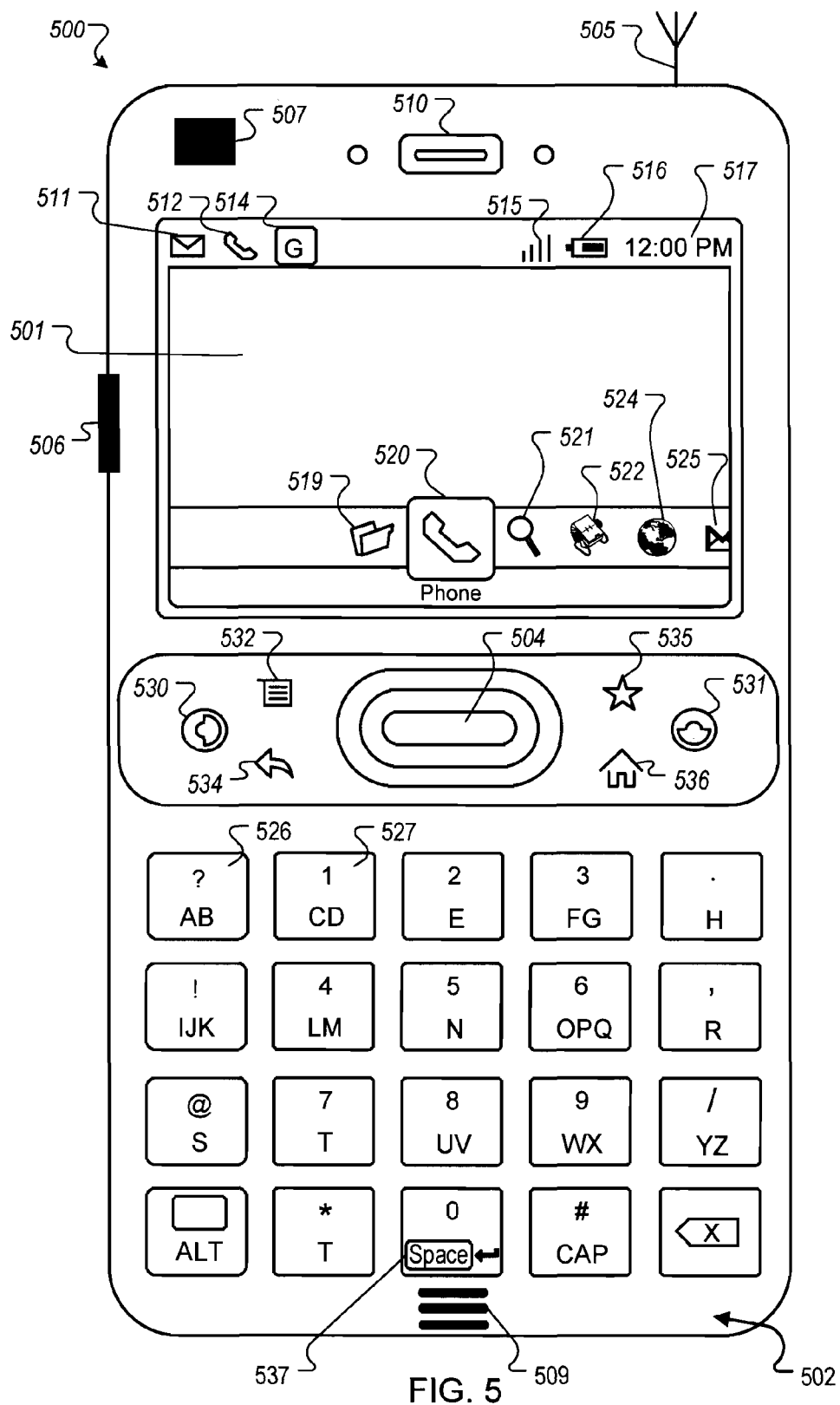
FIG. 5 is a schematic representation of an example mobile device that implements embodiments of the keyboard organization using frequency distribution techniques described herein.

Also, physical keypads may be used, as illustrated in FIG. 5. Such keypads may be laid out in advance by a designer of the device (e.g., according to character distributions in ordinary text across a large population and sample size), or may be laid out by a user, such as by affixing letters to particular keys.

FIGS. 2A-2E illustrate exemplary tables that, in some implementations, can be used to organize keys on a keypad according to a frequency distribution. In the illustrative implementation, the data contained in the tables shown in FIGS. 2B-2E may be generated, in part, by using the information presented in the previous tables. For example, table 205 in FIG. 2B can be generated using the data illustrated in table 200 in FIG. 2A, while table 210 in FIG. 2C may be created using data included table 205 in FIG. 2B, and so on. Each table is explained in greater detail below.

FIG. 2A shows an example frequency distribution table 200 for alphabetical characters. The frequency distribution table 200 can be used to determine which letters of an alphabet occur most often in a selected text sample. By determining which letters are used the most, a keypad designer can determine which letters should be the primary letter associated with each key, i.e., which letters should be input in response to a single key press.

The exemplary frequency distribution table 200 contains one row for each of the 26 letters of the English alphabet. In the columns, the frequency of each letter is illustrated for one of five languages: English, French, German, Spanish, and Italian. It will be noted that the frequency distribution of letters is relatively consistent across the languages shown here. The frequency distribution for the languages shown in the table came from the following sources, with the associated language shown in parentheses:

Cryptographical Mathematics, by Robert Edward Lewand (English)
CorpusDeThomasTempé (French)
Albrecht Beutelspacher, Kryptologie (German)
Fletcher Pratt, Secret and Urgent: the Story of Codes and Ciphers (Spanish)
Simon Singh, Codici e Segreti (Italian)

The frequency distribution for an alphabet can be calculated by counting the number of times each letter appears in a representative text sample and dividing that number by the total number of letters present in the text sample. For example, consider the following sentence from A Tale of Two Cities:

It was the best of times, it was the worst of times, it was the age of wisdom, it was the age of foolishness, it was the epoch of belief, it was the epoch of incredulity, it was the season of Light, it was the season of Darkness, it was the spring of hope, it was the winter of despair, we had everything before us, we had nothing before us, we were all going direct to heaven, we were all going direct the other way—in short, the period was so far like the present period, that some of its noisiest authorities insisted on its being received, for good or for evil, in the superlative degree of comparison only.

A partial frequency distribution for letters in the passage is illustrated in the table below.

|  | A | B | C | D | E | F | G | H | I | J | K | L | M | N |
|---|---|---|---|---|---|---|---|---|---|---|---|---|---|---|
| Count | 28 | 5 | 7 | 14 | 69 | 19 | 13 | 28 | 45 | 0 | 2 | 12 | 5 | 22 |
| Frequency (%) | 5.9 | 1.1 | 1.5 | 2.9 | 14.6 | 4 | 2.7 | 5.9 | 9.5 | 0 | .42 | 2.5 | 1.1 | 4.6 |

Out of the 475 letters in the first sentence of A Tale of Two Cities, the letter A appears 28 times and constitutes approximately 6 percent of the letters in the sentence. Given this frequency distribution, the letter A would make up approximately 6 percent of the letters used in a given text, while the letter J, for example, would, on average, not be used all.

In the illustrative example, the sample text was a single sentence, thus the resulting frequency distribution may not accurately reflect the average usage of letters in the English alphabet. To increase the accuracy of the frequency distribution, the size of the text corpus may be increased and texts representative of a target population may be selected. For example, if the relevant population is English-speaking journalists, the text corpus may include English dictionaries and a large, randomly selected set of newspaper and magazine articles.

FIG. 2B illustrates an exemplary cumulative frequency distribution table 205. The cumulative frequency distribution table 205, like the frequency distribution table 200, shows how often, on average, each letter of the English alphabet occurs in English, French, German, Spanish, and Italian texts, respectively. The cumulative frequency distribution table 205 also includes an additional row indicating the cumulative frequency of the 13 letters in the English alphabet having the highest frequency according to the frequency distribution table 200. The cumulative frequency of these 13 letters is the average frequency of the 13 letters and is calculated by summing the frequencies of the individual letters. In the illustrative example, the letters "E," "T," "A," "O," "I," "N," "S," "H," "R," "D," "L," "C," and "U" form, on average, 83 percent of the letters found in an English-language text. Those letters account for 88 percent of the letters forming texts written in Italian, 87 percent of the letters found in texts written in French or Spanish, and approximately 85 percent of the letters used in the average German-language text. In this example, the 13 letters with the highest frequency in the English alphabet were used to generate the cumulative frequency distribution table 205; however, other alphabets, symbolic systems, and metrics can be used. For example the ten letters with the highest frequency in the German alphabet may be used to generate a cumulative frequency distribution table.

FIG. 2C illustrates an exemplary keystroke table 210. In addition to the data contained in the cumulative frequency distribution data shown in the table 205 in FIG. 2B, the keystroke table 210 contains additional columns that display the number of keystrokes used to enter a letter for specified keypad layouts. In the illustrative example, the keystroke table 210 includes keystroke information for alphanumeric keypads and QWERTY keypads containing various numbers of letter-input keys. The table 210 also a row that indicates the cumulative keystroke information for various keypad layouts for the 13 letters with the highest frequency distribution. For example, to input the letters "E," "T," "A," "O," "I," "N," "S," "H," "R," "D," "L," "C," and "U" requires 30 keystrokes on an alphanumeric keypad that contains 8 letter-input keys, while a QWERTY keypad that includes 15 letter-input keys requires 16 keystrokes to enter these letters.

FIGS. 2D and 2E show example Effective Keystroke Index tables 215, 220. FIG. 2D depicts Effective Keystroke Indices for alphanumeric keypads having various numbers of letter-input keys, while FIG. 2E shows Effective Keystroke Indices for QWERTY keypads with selected numbers of letter-input keys. A keypad's EKI, as mentioned above, is the average number of keystrokes used to enter a character mapped to the keypad for a certain character distribution. A keypad's EKI can be calculated according to the following formula:

$$EKI = \sum_{1}^{n} kf$$

where n is the number of characters and kf, the keystroke frequency, equals the number of keystrokes required to enter a character (k) multiplied by the frequency distribution of the character (f). The sum of the keystroke frequencies for each character is the EKI of the keypad. Each column in the illustrative tables 215, 220 indicates the keystroke frequency for a letter in a specified keypad layout and language, while the last row, labeled EKI, represents the EKI for a given keyboard layout and language.

In an illustrative implementation, using the exemplary frequency distribution table 200 in FIG. 2A, the frequency of each letter in the English alphabet can be determined. For example, the letter "O" occurs approximately 7.5 percent of the time. Subsequently, the number of keystrokes used to enter a character for a given keypad can be determined from the keystroke table 210 in FIG. 2C. Continuing the current example, three keystrokes are used to enter an "O" on an illustrative alphanumeric keypad with eight letter-input keys. Thus, the keystroke frequency for the letter "O" for the illustrative keypad is approximately 0.23 in an English-language text. When the keystroke frequencies for the remaining letters are calculated and subsequently summed, the result is the EKI for the keypad. Here, the EKI for the illustrative alphanumeric keypad with 8 letter-input keys is 2.15. A lower EKI is generally considered better because a sample of text may be entered on the keypad using fewer numbers of keystrokes.

Figure 3:
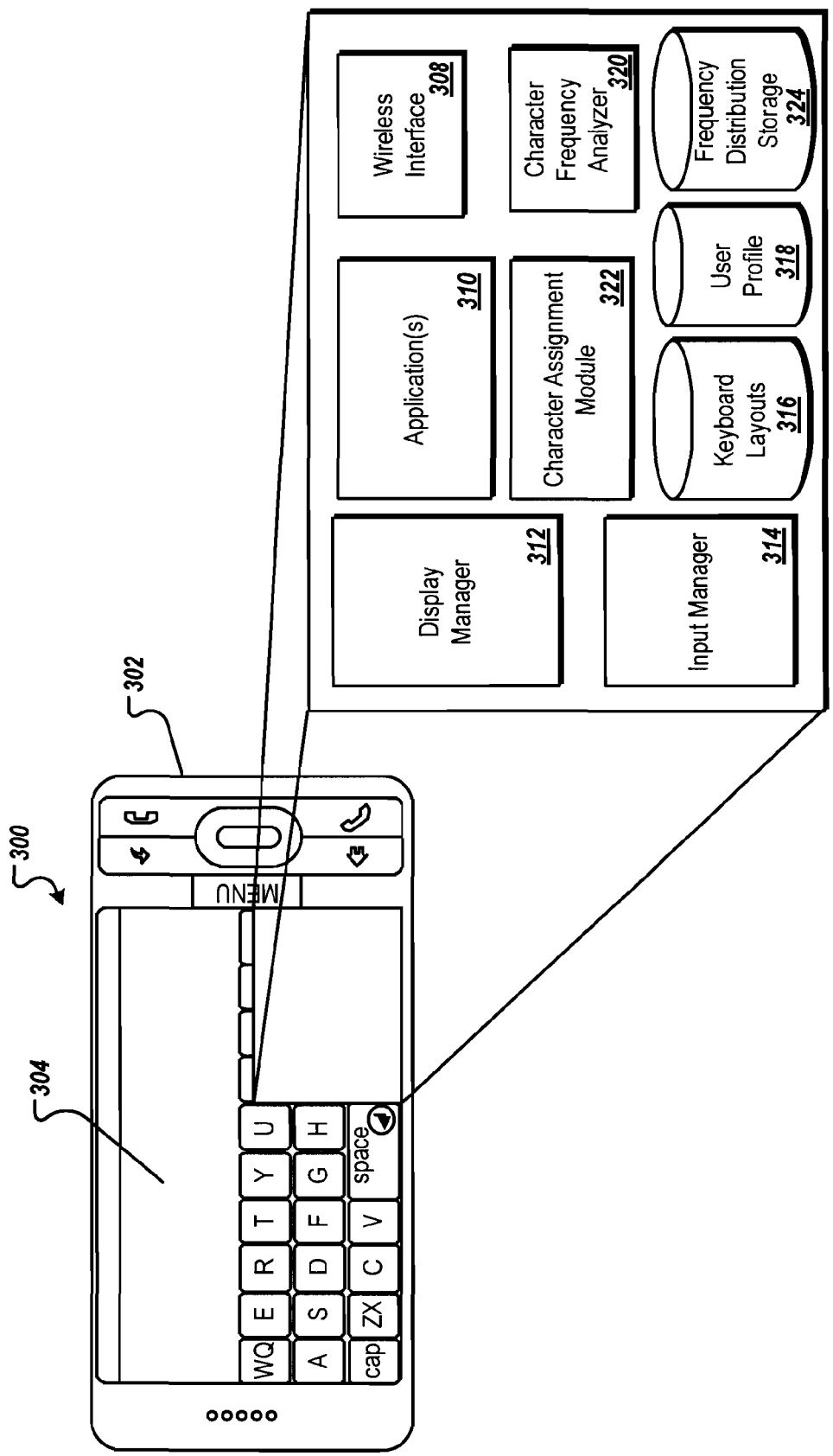
FIG. 3 is a block diagram of an example system for organizing a keypad using frequency distribution.

FIG. 3 is a block diagram of system 300 for organizing a keypad using frequency distribution. The system 300 may be implemented using a mobile device such as device 302. The device 302 includes various input and output mechanisms such as a touch screen display 304. In some implementations, the device 302 may include a roller ball. A number of components within device 302 may be configured to provide various selection functionality on display 304, such as the keypad functionality discussed above.

One such component is a display manager 312, which may be responsible for rendering content for presentation on display 304. The display manager may receive graphic-related content from a number of sources and may determine how the content is to be provided to a user. For example, a number of different windows for various applications 310 on the device 302 may need to be displayed, and the display manager 312 may determine which to display, which to hide, and what to display or hide when there is overlap between various graphical objects. The display manager 312 may also, in appropriate circumstances, such as when the device 302 calls for text entry form a user, provide for the display of a keypad over or next to other elements on display 304.

An input manager 314 may be responsible for translating commands provided by a user of device 302. For example, such commands may come from a keyboard (whether physical or virtual on display 304), from touch screen display 304, from a trackball, or from other such sources, including dedicated buttons or soft buttons (e.g., buttons whose functions may change over time, and whose functions may be displayed on areas of display 304 that are adjacent to the particular buttons). The input manager 314 may determine, for example, in what area of the display commands are being received, and thus in what application being shown on the display the commands are intended for. In addition, it may interpret input motions on the touch screen 304 into a common format and pass those interpreted motions (e.g., short press, long press, multiple press, and straight-line drags) to the appropriate application. The input manager 314 may also report such inputs to an event manager (not shown) that in turn reports them to the appropriate modules or applications.

The device 302 can contain a character frequency analyzer 320 that can create a frequency distribution by determining how frequently characters appear in a selected text corpus. For example, the frequency analyzer may count the number of times a character or symbol appears in a selected text corpus, such as an e-mail outbox of a user of device 302. Then the analyzer 320 can divide the resulting number by the total number of characters in the text corpus. In some implementations, a user may input a frequency for each character in the alphabet or input a frequency distribution for a given text sample. The frequency distribution may also be transmitted over a network or retrieved from memory. The resulting frequency distribution can be stored in frequency distribution storage 324.

The device 302 also can contain a character assignment module 322 that can assign individual characters or character groupings to a key on a keypad. In some implementations, the assignment module 322 may assign several of the most frequently used letters such that a single keystroke can input the letters. For example, consider the cumulative frequency distribution table 205 in FIG. 2B and the illustrative 20-key alphanumeric keypad 106 in FIG. 1. The module 322 may assign the 15 most frequently used letters in table 205—"E," "T," "A," "O," "I," "N," "S," "H," "R," "D," "L," "C," "U," "W," and "F"—to the 15 available letter-input keys on the 20-key keypad 106. The module 322 can group the remaining letters such that a user can access many of the 15 most frequently used letters with a single keystroke, while limiting the number of groupings that contain more than a predetermined number of letters; e.g., the module 322 may limit the groupings such that no group contains more than three letters.

Although the character frequency analyzer 320, frequency distribution storage 324, and character assignment module 322, are shown in this example as residing on a device to which the results of those components' analysis is to be applied, the components may also be stored separately from the device 302. For example, a standard server or desktop computer may be used to compute the distribution of characters (whether alphabetic, numeric, or symbolic) in a sample, may make a determination of a proper layout of characters on a keypad, and may transmit to device 302 information that may be used by device 302 to generate such a keypad.

A variety of applications 310 may operate, generally on a common microprocessor, on the device 302. The applications 310 may take a variety of forms, such as mapping applications, e-mail and other messaging applications, web browser applications, and various applications running within a web browser or running extensions of a web browser. Applications that require textual input may provide a signal to an operating system on device 302, such as to an event manager, when they would like to receive such input, and a keypad such as the keypads shown above, may be generated on display 304. Where the device 302 is slid open so as to expose a physical keypad, the display of a virtual keypad may be bypassed by the system 300.

A wireless interface 308 manages communication with a wireless network, which may be a data network that also carries voice communications. The wireless interface may provide for communication by the device 302 with messaging service such as text messaging, e-mail, and telephone voice mail messaging. In addition, the wireless interface 308 may support downloads and uploads of content and computer code over a wireless network.

Various forms of persistent storage may be provided, such as using fixed disk drives and/or solid state memory devices. Two examples are shown here. First, keyboard layout storage 316 includes data representing one or more keyboard types that may be displayed on the display 304. In some implementations, the layouts may be alphanumeric, QWERTY, QWERTZ, AZERTY, Dvorak, Colemak, user-defined, etc.

Other storage includes a frequency distribution storage 324 and user profile storage 318, both of which may be stored on the same media as the keyboard layout storage 316. The frequency distribution storage 318 can contain frequency distributions determined by the character frequency analyzer 320. The user profile storage 318 includes various parameters about a user of the device 302. In the example relevant here, the user profile may include, among other things, keyboard usage statistics, stored keyboard layout preferences, the speed for a double press by the user, the speed with which trackball movements are to result in on-screen movements of a pointer, particular actions that are to be achieved by multi-touch input, and other such factors.

Figure 4A:
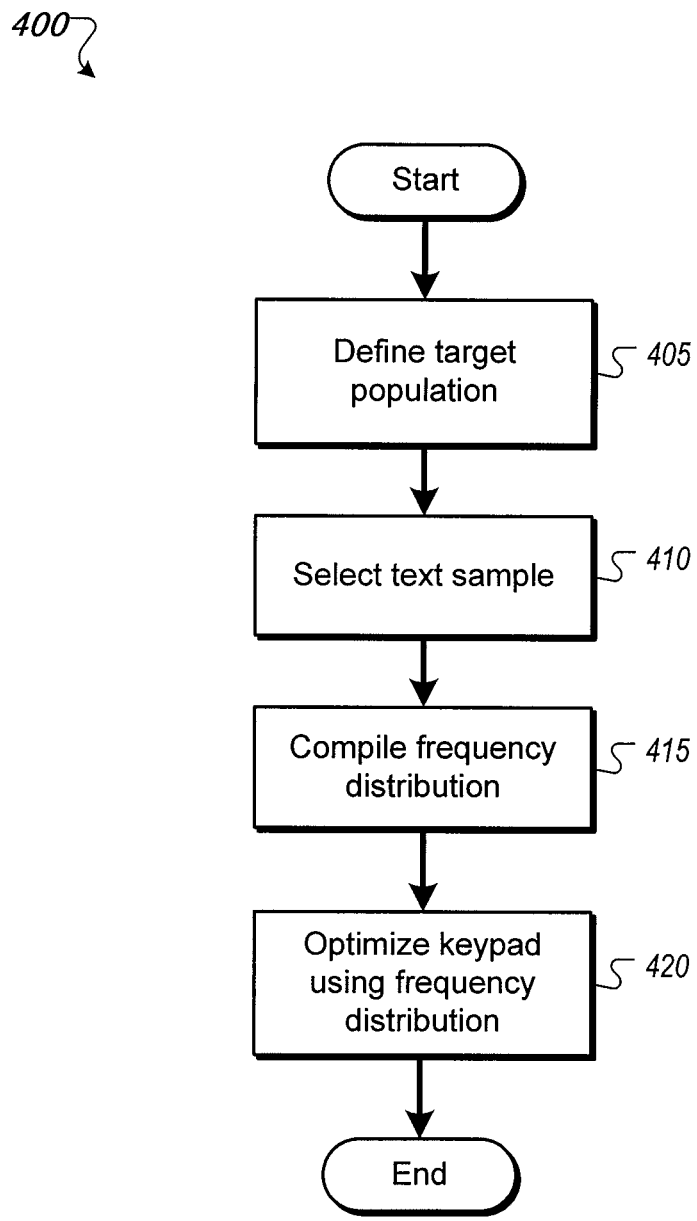
FIGS. 4A-4C show flow charts of example processes for designing keypads using frequency distribution.
Figure 4B:
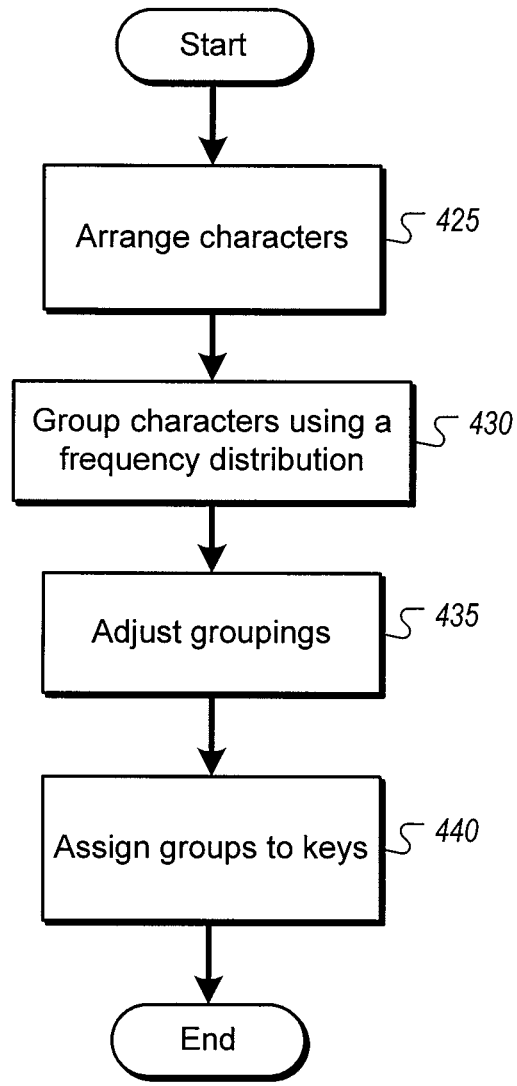
Figure 4C:
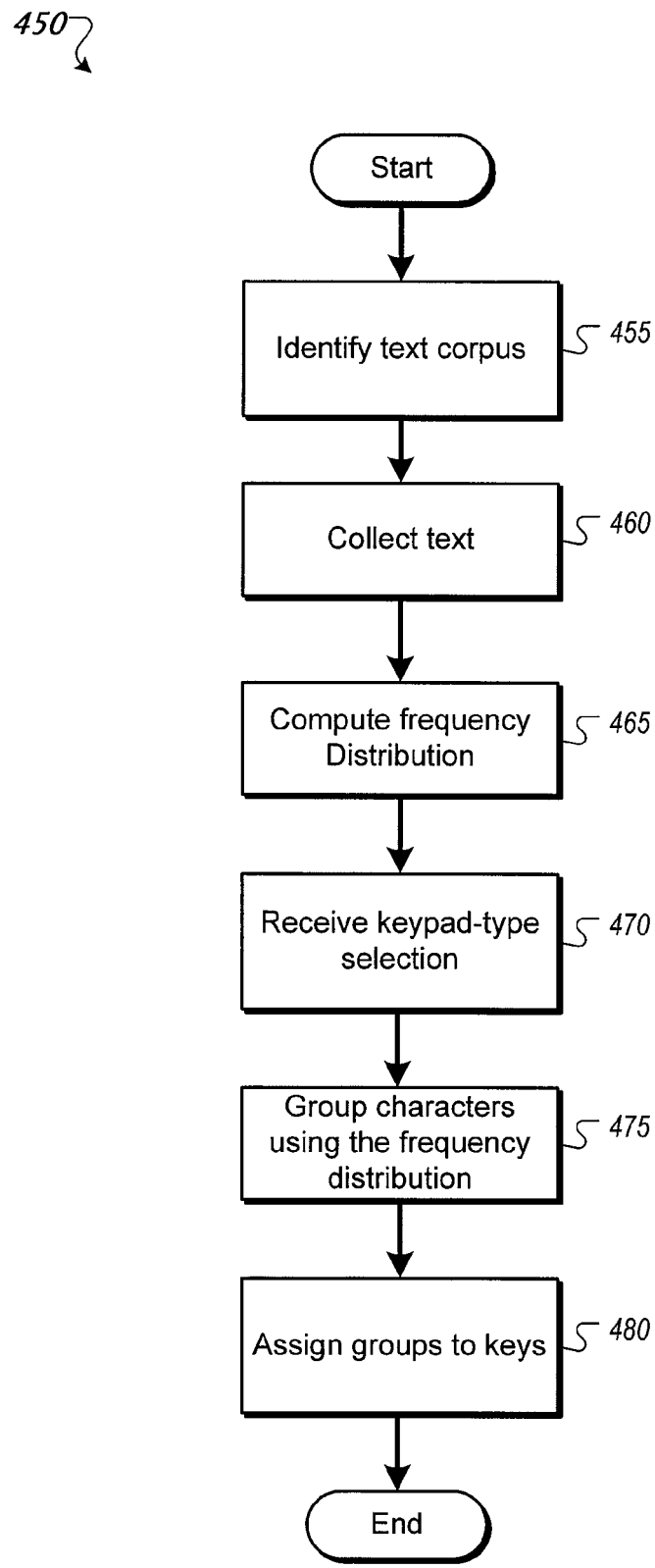

FIGS. 4A-4C are flow charts of processes 400 and 450 for designing keypads using frequency distributions. The processes 400 and 450 may be performed, for example, by a system such as the system 300 and, for clarity of presentation, the description that follows uses the system 300 as the basis of an example for describing the processes. However, another system, or combination of systems, may be used to perform the processes 400 and 450.

At step 405 of process 400, a target population is defined. A target population can be a group of people that share a trait that relates to the way members of the group communicate. For example, group members may share a common language or mode of communication (e.g., email, text message, instant message, etc.) Other examples of traits that might define a target population include age, community (e.g., an Internet community such as a social network), or means of communication (e.g., a particular type of cellular phone or PDA). In some implementations, the group may be defined using traits that are not related to communication, e.g., the group may be defined by a geographic area, type of employment, or employer.

After a target population has been defined, the method proceeds to step 410, where a text corpus is selected for the target population. For instance, if the target group is defined by its use of text messages, the relevant text corpus may include a collection of text messages sent and received by members of the group. If the target group shares a common language, the relevant text corpus might be a dictionary. In some implementations, the text corpus may include a large number of randomly selected text samples from the target population; this approach may increase the reliability of the resulting frequency distribution.

Once a text corpus has been selected, a frequency distribution is compiled at step 415. In some implementations, a frequency distribution may be compiled by counting the number of times each character appears in the representative text corpus and dividing that number by the total number of characters in the text corpus. For keyboard layouts that separate letters from numbers and symbols (e.g., punctuation marks), it may be necessary to separate the corpus into related groups (e.g., letters in one group and numbers and symbols in a separate group) and then compile a frequency distribution for each group.

Finally, after the frequency distribution is compiled at step 415, the keypad may be optimized using the compiled frequency distribution at step 420. For example, consider a text corpus consisting of English-language text. In some implementations, the letters can be arranged in a predetermined order and then subsequently grouped using the frequency distribution calculated at step 410. Afterwards, the character grouping can be mapped to the keypad. The process of optimizing a keypad using a frequency distribution is described in detail in reference to FIG. 4B.

FIG. 4B shows an illustrative process for organizing a keypad using frequency distribution. Once a frequency distribution has been created as described in reference to FIG. 4A, characters in the selected text sample may be arranged at step 425. In an illustrative example, the letters may be arranged according to a predetermined sequence. For example, the characters may be arranged alphabetically. Or, in some implementations, the characters can be arranged according to the layout of the selected keyboard type. For example, if a user selects a QWERTY keyboard, the letters may be arranged according to the QWERTY layout; i.e., the letters may be arranged as follows: QWERTYUIOP . . . etc. Or, in some implementations, symbols may also be grouped according to frequency distribution to create an additional keypad for symbol input. In an alternative implementation discussed further below, the selected keyboard layout can be arranged according to user specifications and the letters can be indexed according to the custom user keyboard layout.

After the letters have been arranged at step 425, the letters can be grouped using a frequency distribution at step 430. In some implementations, the letters may be grouped such that the letters in the primary position in each grouping—i.e., the letters that can be input with a single keystroke—are the letters with the highest frequency. For example, consider the exemplary keypad 106. Although keypad 106 contains 20 keys, in the illustrative example only 15 keys are used to input letters. In the illustrative implementation, the 15 most frequently used letters in FIG. 2B—"A," "C," "D," "E," "H," "I," "L," "M," "N," "O," "R," "S," "T," "U," and "W"—can be used to initially group the remaining 11 letters in the alphabet such that these 15 letters are the first letters in the resulting groupings. For example, the initially groupings might include "AB," "C," "D," "EFG," "H," "IJK," "L," "M," "N," "OPQ," "R," "S," "T," "UV," "WXYZ."

In some implementations, the initial grouping may be adjusted at step 435. In some circumstances, additional considerations may affect the grouping of the characters. For example, characters may be grouped with two considerations in mind: (1) mapping some of the most frequently used characters to primary positions on the keypad (i.e., lowering the EKI of the keypad); and (2) minimizing the number of keys that have an unwieldy number of letters mapped to the key. For instance, the illustrative grouping described in the preceding paragraph results in four letters ("WXYZ") being mapped to one key. A keypad designer can subsequently rearrange the groupings to reduce the number of letters mapped to each key, while still assigning many of the most frequently used letters to a primary position on the keypad. For example, a keypad designer may map two frequently used letters to a single key to reduce the number of letters mapped to other keys. For example, keypad 106 has the letters "C" and "D" mapped to a single key and "L" and "M" mapped to another key. This allows the designer to split the "WXYZ" grouping in two and assign "F," another frequently used key, to a primary position on the keypad, while ensuring that no key has more than three letters mapped to it. At step 440, the groupings may be assigned to keys. For example, the groups may be assigned to the keys in an order determined by the desired keyboard layout. For instance, the order may be determined by the sequence of letters in a QWERTY or user-defined keyboard layout or the order may be alphabetical, among many other possible orders. In the example depicted in FIG. 1, the resulting alphanumeric keypad 106 has several of the most frequently used letters (as shown in table 200 in FIG. 2A) mapped to the primary position on a key, and no key has more than three letters mapped to a key.

FIG. 4C illustrates another example process 450 for designing keypads using frequency distribution. The process 450 begins at step 455 where a text corpus is identified. As described in reference to FIG. 4A above, a body of text representative of a target population can be identified. In some implementations, the body of text can be randomly selected from a collection of text associated with a target group. Subsequently, the text can be collected at step 460. For example, irrelevant text (e.g., text not written by the user or not germane to the target population) can be removed from the message. For example, if the text corpus includes e-mails, text in the "To" or "Cc" lines may be removed from the emails. Similarly, if the text corpus includes published books, bibliographic information such as the name of the publisher, the publication date, ISBN number, etc. can be removed from the corpus. The text can be manually removed by a user or automatically by a computer system. For example, the system may compare a predetermined template to the text and remove sections of the text that fall within areas that generally contain irrelevant information (e.g., the publication data contained in the front of many published books). In other implementations, the system may search for specified keywords and remove the keyword along with text in a predefined area surrounding the keyword.

After the text has been collected, a frequency distribution for the collected text may be computed at step 465. In some implementations, the number of times each letter appears in the collected text may be counted. Subsequently, the resulting number can be divided by the total number of letters in the collected text to determine how often that letter appears in the collected text. This process—counting the number of times a letter appears in the collected text and dividing that number by the total number of letters in the text—can be repeated for each letter in the alphabet to produce a frequency distribution for the letters.

Subsequently, a keypad-type selection can be received at step 470. In some implementations, a user may select one of a plurality of different keyboard layouts including alphanumeric, QWERTY, QWERTZ, AZERTY, Dvorak, Colemak, etc. For example, using the device's 302 graphical user interface, the user may select one the previously mentioned keyboard layouts from a menu system.

In some implementations, a user may create and select a custom keypad. For example, the user may designate the number of keys that form the keypad using the graphical user interface. In the illustrative example, the user may enter the desired number of keys into a dialog box presented by the graphical user interface. In other implementations, the user may designate a number of keys within predetermined thresholds, e.g. 10 to 30 keys. The user may also specify the desired number of keys by selecting the number of rows and columns of the keypad that the user desires.

In addition, in some implementations, a user can arrange the order and grouping of letters and symbols on the keys. For example, the user can shift a grouping of letters from one key to another, transpose rows or columns, or add an extra row of keys and populate the keys with their choice of punctuation, symbols, and characters.

In addition to choosing a keypad layout, in some implementations, the user may select the size of the keys or the number of keys on a keypad. For example, the user may be presented with a menu that allows the user to choose between a standard keyboard (e.g., a keyboard with 21 letter keys) and a keyboard with larger keys (e.g., a keyboard with 15 letter keys).

After receiving a keypad-type selection, the characters may be grouped using the frequency distribution at step 475. Subsequently, the groups may be assigned to keys at step 480. Steps 475 and 480 are described in detail in reference to steps 430-440 in FIG. 4B.

Referring now to FIG. 5, the exterior appearance of an exemplary device 500 that implements the features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna

505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The illustrative keyboard 502 was designed using the techniques described above. The keyboard 502 includes buttons or keys associated with alphanumeric characters, where more than one character is mapped to some of the keys. For example, keys such as keys 526 and 527 are associated with the alphanumeric characters "AB" and "CD." A single press of key 526 will input in "A"; two presses within a specified time will input a "B." Inputting "C" and "D" using key 527 occurs in a similar fashion. A key may also be associated with one or more special characters or functions, including unlabeled functions, based upon the state of the operating system or applications invoked by the operating system. For example, the Space-Return key 537 can, as described above, be used to enter either a space or a carriage return.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540 power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
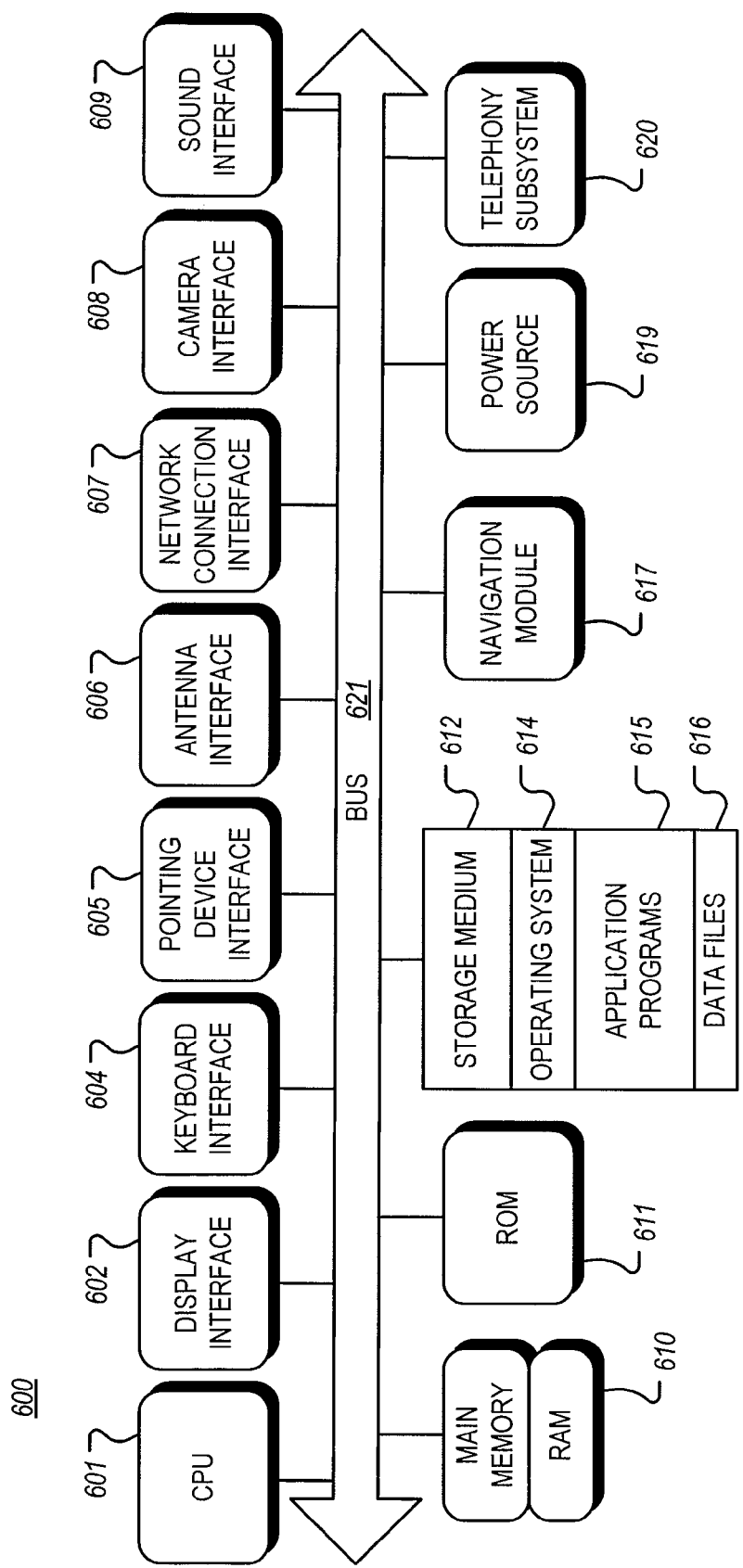
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
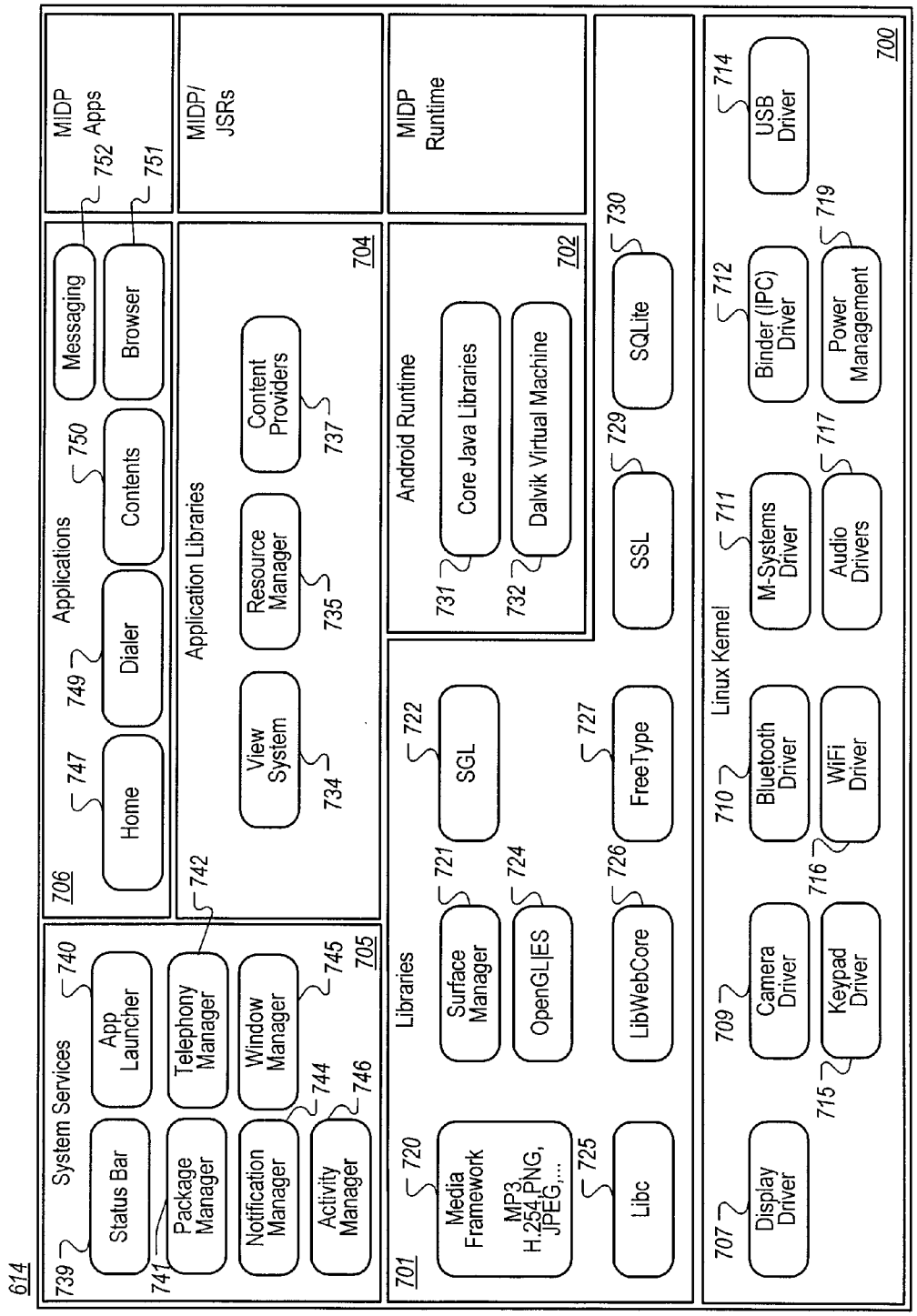
FIG. 7 is a block diagram illustrating example components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 615 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 619.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated byte-codes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, a browser application 751, and a messaging application 752.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
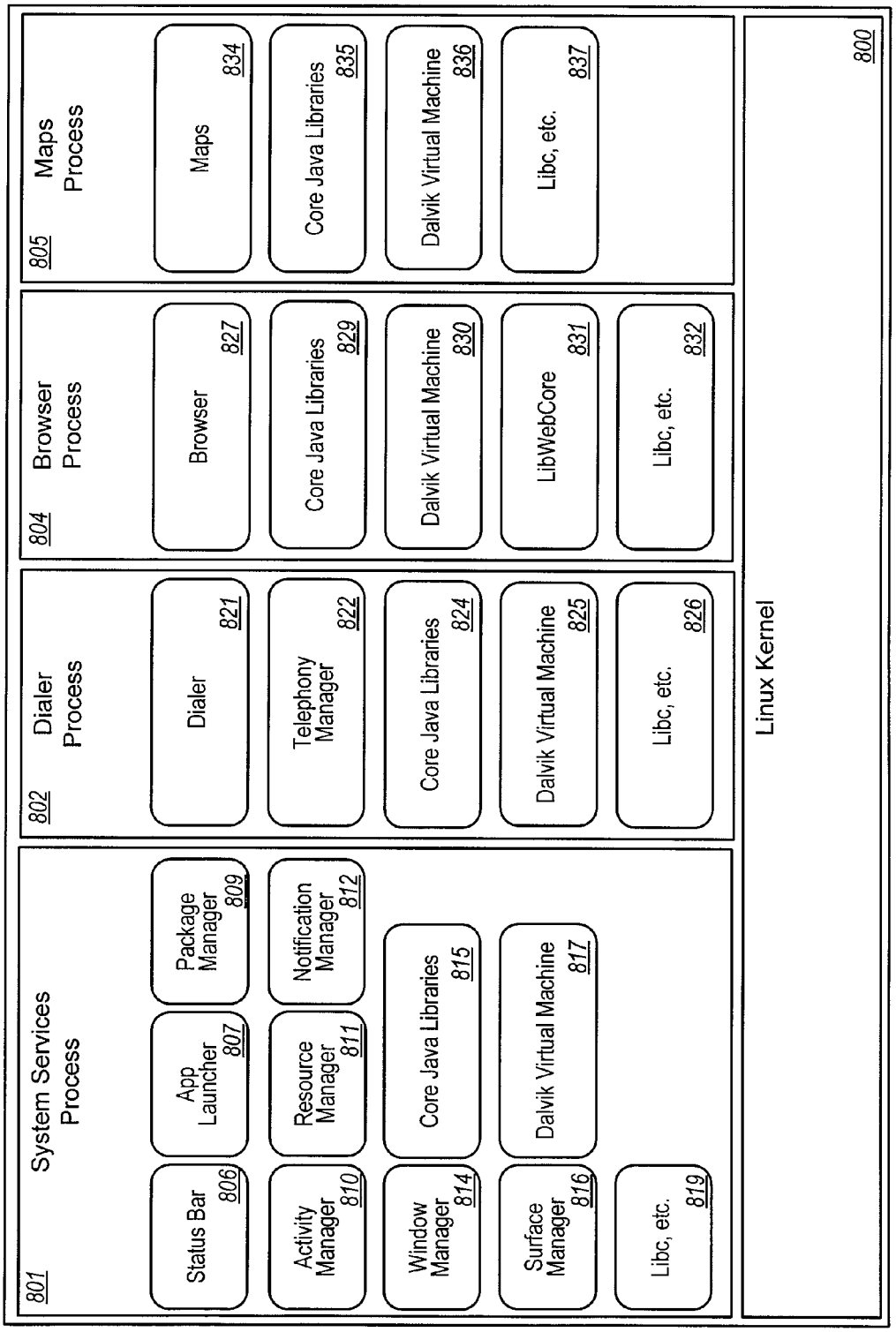
FIG. 8 is a block diagram illustrating example processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
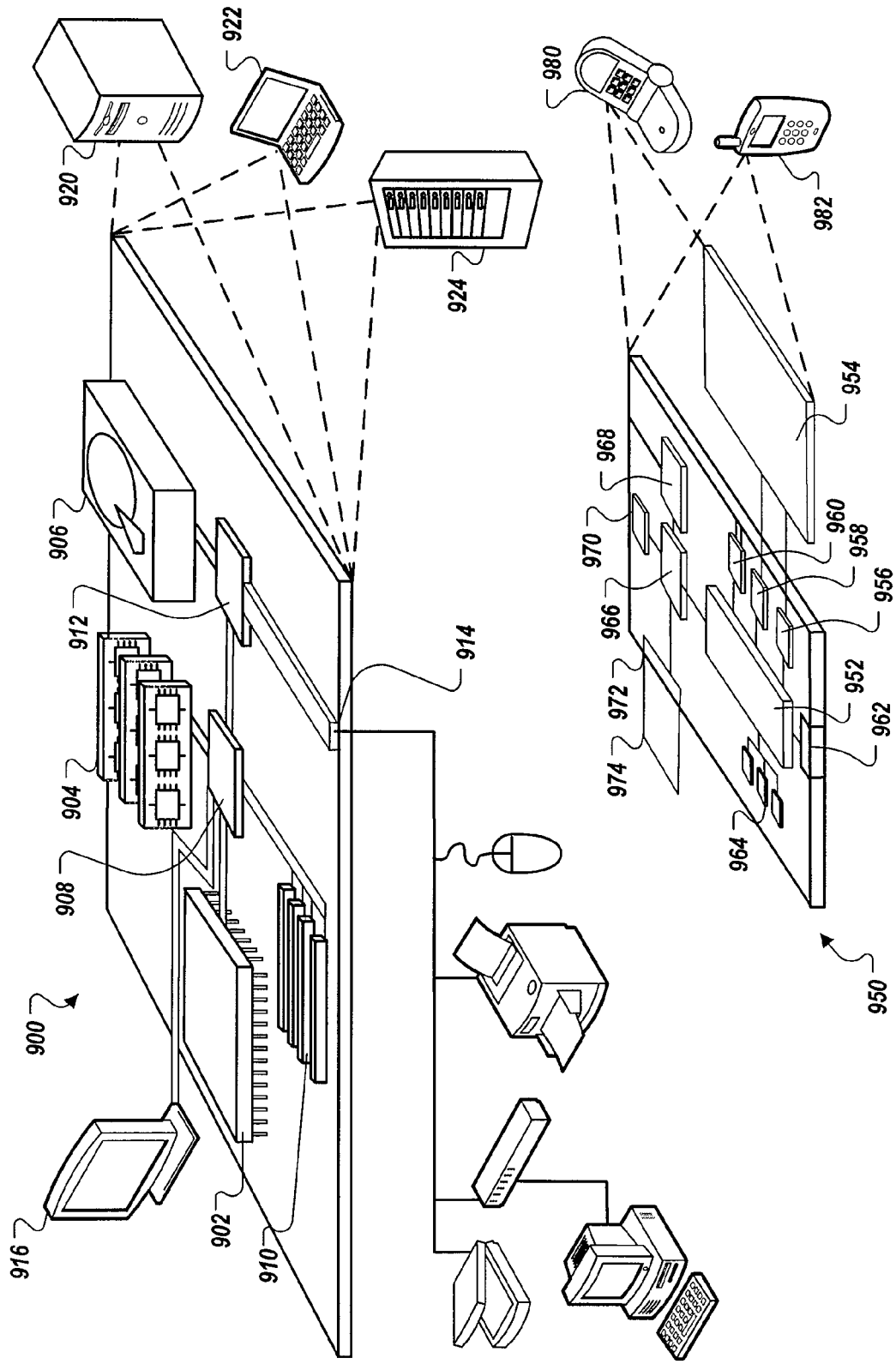
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has related to organizing alphanumeric characters on a keypad using a frequency distribution; however, any appropriate system of symbolic representation may organized using a frequency distribution and mapped to a keypad. For example, mathematical operators, geometric shapes, symbols representing keypad functions, etc. can be mapped to a keypad in the manner described here.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
    determining that a user is a member of a target group of users having a shared language and having one or more additional shared characteristics, wherein the user is determined to be a member of the target group based on determining that the user shares the language and the one or more additional characteristics;
    selecting, from a collection of text, a text sample comprising multiple examples of text authored by users within the target group;
    determining, by one or more computers, a frequency-distribution of characters for the text sample;
    generating character groupings based on the frequency-distribution;
    assigning the character groupings to keys on a keypad layout so that characters that appear most frequently in the text sample can be selected by the user with a single keystroke; and
    providing a keypad exhibiting the keypad layout for interaction with the user on a touch-sensitive display.

2. The method of claim 1, wherein generating the character groupings further comprises arranging the characters according to a predetermined sequence and grouping adjacent characters in the sequence such that each character grouping contains at least one character that frequently appears in the text sample.

3. The method of claim 2, wherein generating the character groupings further comprises receiving input from the user selecting a keypad layout that identifies the predetermined sequence of the characters.

4. The method of claim 1, wherein generating the character groupings further comprises grouping the characters such that each of the character groupings contains less than a predetermined number of characters.

5. The method of claim 4, wherein the predetermined number of characters is three characters.

6. The method of claim 1, wherein the frequency distribution is determined by selecting a portion of the characters in the text sample and counting the occurrence of each character within that portion of the sample.

7. The method of claim 1, wherein determining a frequency-distribution further comprises:
    determining the number of times each character in the text sample appears in the text sample; and
    determining the frequency of occurrence in the text sample of each character by dividing the number of times each character appears in the text sample by the total number of characters in the text sample.

8. The method of claim 1, wherein the text sample comprises multiple examples of text written by the user.

9. The method of claim 1, further comprising:
    receiving a request for the keypad, the request associated with the user;
    wherein selecting a text sample, determining the frequency-distribution, generating the character groupings, assigning the character groupings, and providing the keypad each occur in response to receiving the request.

10. A system comprising:
    one or more computers and one or more storage devices storing instructions that are operable, when executed by the one or more computers, to cause the one or more computers to perform operations comprising:
        determining that a user is a member of a target group of users having a shared language and having one or more additional shared characteristics, wherein the user is determined to be a member of the target group based on determining that the user shares the language and the one or more additional characteristics;
        selecting, from a collection of text, a text sample comprising multiple examples of text authored by users within the target group;
        determining a frequency-distribution of characters for the text sample;
        generating character groupings based on the frequency-distribution;
        assigning the character groupings to keys on a keypad layout so that characters that appear most frequently in the text sample can be selected by the user with a single keystroke; and
        providing a keypad exhibiting the keypad layout for interaction with the user on a touch-sensitive display.

11. The system of claim 10, wherein the text sample comprises multiple examples of text written by the user.

12. The system of claim 10,
    wherein the operations further comprise receiving a request for a keypad, the request associated with the user;
    and wherein selecting a text sample, determining the frequency-distribution, generating the character groupings, and assigning the character groupings each occur in response to receiving the request.

13. The system of claim 10, wherein generating the character groupings further comprises arranging the characters according to a predetermined sequence and grouping adjacent characters in the sequence such that each character grouping contains at least one character that frequently appears in the text sample.

14. The system of claim 13, wherein generating the character groupings further comprises receiving input from the user selecting a keypad layout that identifies the predetermined sequence of the characters.

15. The system of claim 10, wherein generating the character groupings further comprises grouping the characters such that each of the character groupings contains less than a predetermined number of characters.

16. The system of claim 15, wherein the predetermined number of characters is three characters.

17. The system of claim 10, wherein the frequency distribution is determined by selecting a portion of the characters in the text sample and counting the occurrence of each character within that portion of the sample.

18. The system of claim 10, wherein determining a frequency-distribution further comprises:
   determining the number of times each character in the text sample appears in the text sample; and
   determining the frequency of occurrence in the text sample of each character by dividing the number of times each character appears in the text sample by the total number of characters in the text sample.

19. A non-transitory computer-readable medium storing software comprising instructions executable by one or more computers which, upon such execution, cause the one or more computers to perform operations comprising:
   determining that a user is a member of a target group of users having a shared language and having one or more additional shared characteristics, wherein the user is determined to be a member of the target group based on determining that the user shares the language and the one or more additional characteristics;
   selecting, from a collection of text, a text sample comprising multiple examples of text authored by users within the target group;
   determining a frequency-distribution of characters for the text sample;
   generating character groupings based on the frequency-distribution;
   assigning the character groupings to keys on a keypad layout so that characters that appear most frequently in the text sample can be selected by the user with a single keystroke;
   providing a keypad exhibiting the keypad layout for interaction with the user on a touch-sensitive display.

20. The medium of claim 19, wherein the text sample comprises multiple examples of text authored by the user.

21. The medium of claim 19,
   wherein the operations further comprise receiving a request for a keypad, the request associated with the user;
   and wherein selecting a text sample, determining the frequency-distribution, generating the character groupings, and assigning the character groupings each occur in response to receiving the request.

22. The medium of claim 19, wherein generating the character groupings further comprises arranging the characters according to a predetermined sequence and grouping adjacent characters in the sequence such that each character grouping contains at least one character that frequently appears in the text sample.

23. The medium of claim 22, wherein generating the character groupings further comprises receiving input from the user selecting a keypad layout that identifies the predetermined sequence of the characters.

24. The medium of claim 19, wherein generating the character groupings further comprises grouping the characters such that each of the character groupings contains less than a predetermined number of characters.

25. The medium of claim 24, wherein the predetermined number of characters is three characters.

26. The medium of claim 19, wherein the frequency distribution is determined by selecting a portion of the characters in the text sample and counting the occurrence of each character within that portion of the sample.

27. The medium of claim 19, wherein determining a frequency-distribution further comprises:
   determining the number of times each character in the text sample appears in the text sample; and
   determining the frequency of occurrence in the text sample of each character by dividing the number of times each character appears in the text sample by the total number of characters in the text sample.

28. The method of claim 1, wherein at least one of the additional characteristics is the use of certain computing applications.

* * * * *